United States Patent Office 2,973,393
Patented Feb. 28, 1961

2,973,393
CHLORINATION OF ACETYLENES

Roger F. Monroe, Midland, Mich., assignor to The Dow Chemical Company, Midland, Mich., a corporation of Delaware No Drawing. Filed Oct. 2, 1958, Ser. No. 764,782

3 Claims. (Cl. 260—654)

The present invention relates to the production of aliphatic chlorides and is more particularly concerned with a new and useful process for the production of chlorinated alkanes and chlorinated olefins from alkynes.

It has now been found that alkylacetylenes can be chlorinated directly to obtain desirable olefinic chlorides and tetrachloroalkanes, provided the reaction is carried out in accordance with the method hereinafter described. While little is known of the mechanism by which the reaction takes place the following general equation exemplifies the observable results.

(I)

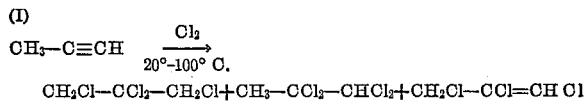

While the reactant has been exemplified as an alkyl acetylene it is to be understood that commercial alkyl acetylenes contain up to 30 or more percent of the allene tautomers. The reaction proceeds readily when the chlorine is employed in an amount of at least 2 moles, and preferably at least 4 moles, of chlorine per mole of acetylene. Although the reaction has been described in terms of alkyl acetylene as being the reactant it is to be understood that substantially equivalent results can be obtained when the tautomeric allene compound is used. Therefore, the terms acetylene and acetylenic compound are intended hereinafter to refer to and be inclusive of organic compounds having acetylenic electronic configurations as well as those having allenic electronic configurations.

The chlorination of the acetylenic compound to the 1,2,3-trichloropropene and 1,1,2,2- and 1,2,2,3-tetrachloropropanes takes place smoothly at temperatures below about 100° C. preferably between about 25° and 40° C. The reaction is usually carried out at about atmospheric pressure. However, sub- or superatmospheric pressures can be employed if desired. Above about 100° C. the reaction takes place in the manner of my copending application Serial No. 767,768, filed even date herewith to produce the monochloroacetylenes and the dichloroolefins.

In carrying out the reaction, an acetylenic compound and chlorine are vaporized, preheated to between about 20° and 80° C. and introduced into a packed reaction zone maintained between about 20° and 100° C., and preferably between about 25° and 40° C. The reaction mixture is withdrawn from the reaction zone and the products are condensed and separated from the reaction gases and unreacted reactants, viz., acetylenic compound. The product is usually a mixture containing about 15–30 percent of 1,2,3-trichloroalkene, the remainder being mostly the 1,1,2,2- and 1,2,2,3-tetrachloroalkanes.

The reaction zone is usually a column packed with an inert material such as glass rings, or beads or other shapes, porcelain shapes, aluminum oxide shapes, iron-oxide-silica aluminate (ground fire brick) shapes and the like.

It is to be understood that substantially any alkyne can be employed, in the method of the present invention, which has the general formula $$R—C\equiv CH$$

wherein R represents a lower alkyl radical having from 1 to 4 carbon atoms, inclusive. Thus one can employ methylacetylene (propyne-1); ethylacetylene (butyne-1); propylacetylene (pentyne-1); butylacetylene (hexyne-1); isobutylacetylene (4-methylpentyne-1); and the like, and allene, methylallene, and the like.

The following examples illustrate the present invention but are not to be construed as limiting:

Example 1

Chlorine gas and vaporized methylacetylene were simultaneously introduced in a ratio of about 4 to 1, respectively, into a tubular reactor 30 inches long and 1 inch in diameter, and packed with ¼ inch glass rings. The reactor temperature was maintained at 80° C. The rate of introduction of chlorine was 0.042 mole per minute. The reaction mixture was led from the reactor to a condenser and then to a gas separator. The gases were led to a Dry Ice trap where methylacetylene was collected and then to a water scrubber to remove the HCl of reaction. The desired products were recovered as liquids from the separator and analyzed. The product analyzed 15 percent 1,2,3-trichloropropene and 20 percent 1,2,2,3-tetrachloro-1-propane and 65 percent 1,1,2,2-tetrachloro-1-propane.

Example 2

In the manner of the foregoing example, employing ethylacetylene in place of methylacetylene, there was obtained 1,2,3-trichloro-1-butene, 1,1,2,3-tetrachlorobutane and 1,2,2,3-tetrachlorobutane. Other lower alkylacetylenes behave similarly.

I claim:

1. A process which comprises reacting by contacting, in the absence of a catalyst, an alkylacetylene having from 1 to 4 carbon atoms in the alkyl substituent with at least 2 moles of chlorine per mole of acetylene in a reaction zone maintained at a temperature between about 20° and 100° C., and, withdrawing from said reaction zone at least 1 of the following products, 1,2,3-trichloro-1-alkene, 1,1,2,2-tetrachloroalkane, and 1,2,2,3-tetrachloroalkane.

2. The process of claim 1 wherein the temperature of the reaction zone is maintained between 25° and 40° C.

3. The process of claim 1 wherein the molar ratio of acetylenic compound to chlorine is not more than 1 to 4.

References Cited in the file of this patent

UNITED STATES PATENTS

| 908,051 | Voigt | Dec. 29, 1908 |
| 2,016,572 | Baumann et al. | Oct. 8, 1935 |
| 2,444,661 | Maude | July 6, 1948 |
| 2,610,215 | Vanharen | Sept. 9, 1952 |
| 2,661,379 | Calingaert | Dec. 1, 1953 |